April 19, 1966     V. H. B. WILHITE     3,246,468
STEERING MEANS FOR ROCKETS
Filed Aug. 10, 1962     2 Sheets-Sheet 1
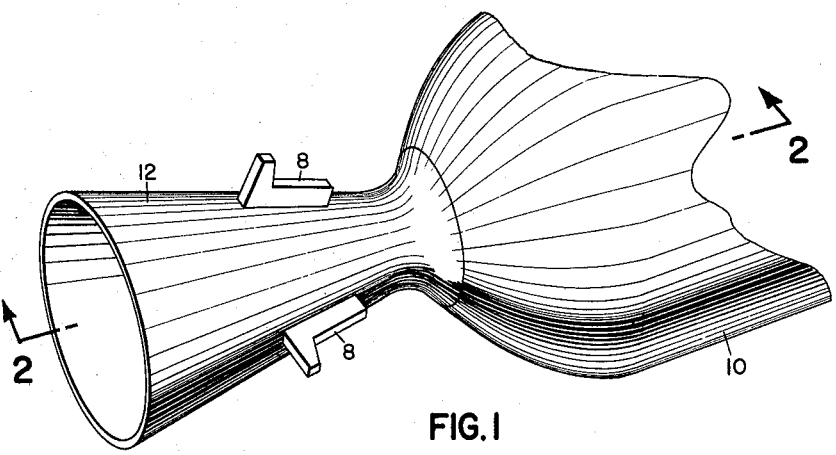
FIG. I
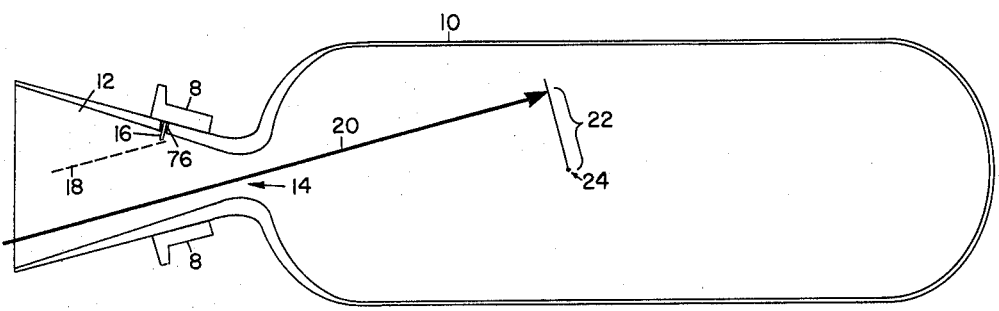
FIG. 2
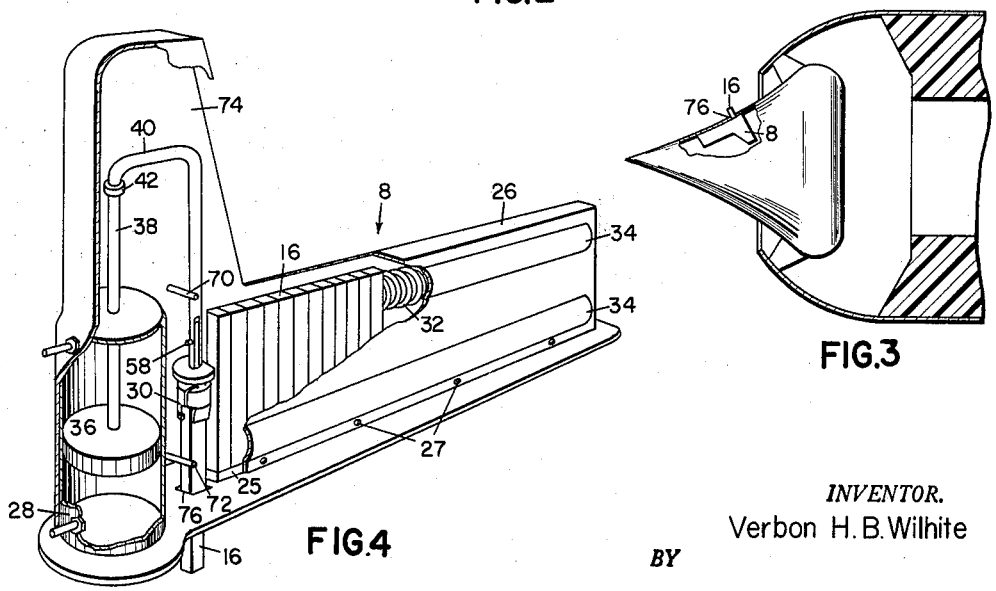
FIG. 3
FIG. 4
*INVENTOR.*
Verbon H. B. Wilhite
BY
*Curtis, Morris & Safford*
ATTORNEYS April 19, 1966  V. H. B. WILHITE  3,246,468
STEERING MEANS FOR ROCKETS Filed Aug. 10, 1962  2 Sheets-Sheet 2

INVENTOR.
Verbon H. B. Wilhite
BY
Curtis, Morris & Safford
ATTORNEYS

United States Patent Office 3,246,468
Patented Apr. 19, 1966

3,246,468
STEERING MEANS FOR ROCKETS
Verbon H. B. Wilhite, Brigham City, Utah, assignor to Thiokol Chemical Corporation, Bristol, Pa., a corporation of Delaware
Filed Aug. 10, 1962, Ser. No. 216,203
7 Claims. (Cl. 60—35.54)

This invention relates to improvements in devices for steering jet-propelled vehicles such as rockets and the like. In particular, it relates to improvements in a device for deflecting a supersonic jet stream by a shock wave resulting from insertion of a small obstruction into the jet stream.

One of the known ways of changing the direction of a supersonic gaseous jet is to introduce a small obstruction into its jet stream. Compressed gas accumulates upstream of the obstruction and creates detached shock wave in the supersonic gas that may deflect the entire stream through a considerable angle even of high performance rocket engines. This means of deflecting a jet has many advantages over other methods of changing the direction of a rocket, because of its compactness and light weight. However, it is difficult to find a material for such an obstruction that can withstand the very erosive, high-temperature environment produced by the exhaust stream of a high-energy rocket, especially of the solid-propellant variety. Also, the degree to which the thrust vector of a rocket can be diverted by means of a simple obstruction is somewhat limited, and it has been found that this effect is not a linear function of the distance which such an obstruction extends into the exhaust stream.

My invention is directed to a thrust-deflecting rocket nozzle in which segments of expandable deflecting rods may be introduced into the exhaust stream of a rocket by a special feed mechanism. In this system, the jet-deflecting obstruction may be continuously replenished as it erodes or burns away in the exhaust stream, thus circumventing the problem of survival of such an obstruction in the exhaust stream of a high-performance rocket. Also, the deflector-rod segments of my invention are expendable and, hence, discharge gaseous material into the exhaust stream of a rocket and amplify the shock-wave effect over that created by a nonexpendable deflector. In fact, it is possible to amplify this effect even more by use of deflector-rod segments containing material that generates gas in the environment of the exhaust stream.

An object of my invention, therefore, is to provide an improved apparatus for steering jet propelled vehicles which is of a relatively simple, compact and light weight construction.

Another object of my invention is to provide a mechanism for steering a rocket which utilizes inexpensive, expendable materials to deflect the exhaust stream of the rocket.

Another object of my invention is to provide a light-weight mechanism for steering a rocket which utilizes the products of a disintegrated obstruction in the exhaust stream to amplify the effect of the obstruction.

Another object of my invention is to provide an improved steering mechanism for a rocket engine which feeds deflector rod segments into the exhaust stream of a rocket and one that may be used with equal effectiveness on rocket engines of varying energies and produce varying effects in the same rocket engine by use of deflector rods made of different materials.

Other objects and advantages of the invention will become apparent as the following description is read with reference to the accompanying drawings, wherein corresponding parts are designated by identical characters throughout the several views.

Referring to the drawings:

FIGURE 1 is a perspective view of the aft end of a typical rocket engine and showing the steering mechanism of the present invention attached thereto;

FIGURE 2 is a sectional diagrammatic view of the rocket engine taken on line 2—2 of FIGURE 1, and showing the effect of the shock wave produced by the mechanism of the present invention to change the direction of thrust;

FIGURE 3 is a fragmentary sectional view showing the invention incorporated in a plug type nozzle for a rocket engine;

FIGURE 4 is a perspective view partly in section of a hydraulically-operated feeder which constitutes a part of the invention;

Figure 5:
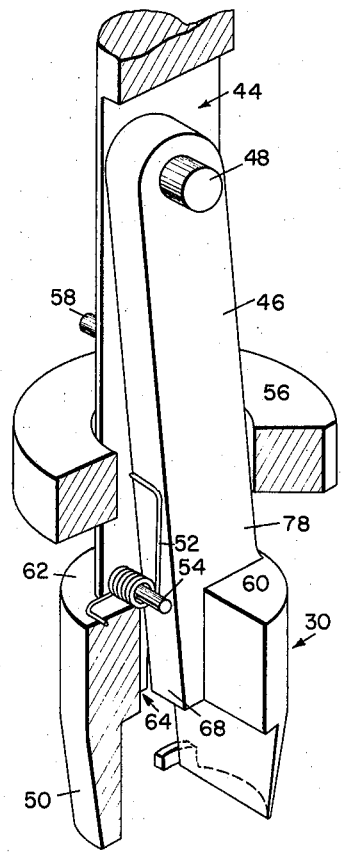
FIGURE 5 is a perspective view of a modified collet-chuck mechanism for feeding deflecting rod segments.

FIGURE 1 illustrates the most economical arrangement of the feeders 8 spaced 90° apart on a typical rocket engine 10 equipped with a single nozzle 12. The nozzle 12 has the form of a hollow cone diverging from an orifice 14, best shown in FIGURE 2. FIGURE 2 also illustrates how a small obstruction in the form of an expendable deflector rod 16 introduced by one of the feeders 8 into the jet stream of the rocket exhaust produces a shock wave indicated by line 18 at an angle to the axis of the nozzle. This shock wave deflects the exhaust jet from one side of the nozzle 12 and produces a change in direction of the thrust vector 20 which, in turn, creates a moment arm 22 about the center of mass 24 of the rorket to effect steering of the rocket.

The preferred form of the feeder 8, as shown in FIGURE 4, consists essentially of a spring-loaded magazine 26 for deflecting rod segments 16, a fluid-operated, motor cylinder 28 and a collet chuck 30. The magazine 26 is substantially a rectangular enclosure constructed to contain a plurality of the expendable deflector-rod segments 16 in a side-by-side relationship. The end of magazine 26 located adjacent the side of the fluid-operated cylinder 28 is open to permit engagement of the deflector rod segments by a collet chuck 30 as they are advanced by the action of two compression springs 32. The vertical sides of magazine 26 are fluted at 34 to provide guiding means for the compression springs 32. Magazine 26 is detachably connected to base 25 by screws 27. The fluid operated cylinder 28 is of a type well known in the art and is preferably hydraulic, having a double acting piston 36 and an actuator shaft 38 attached perpendicularly to the center of the piston 36. The chuck 30 is fastened by suitable means to the actuator shaft 38 that most advantageously places the chuck 30 in a position to grasp the end portion of a deflector-rod segment. In the illustrated embodiment, the fastening means is in the form of a U-shaped yoke 40 having a threaded engagement at one end 42 with actuator shaft 38. The chuck mechanism is shown in detail in FIGURE 5 as comprising a longitudinal slot 44 in the opposite end of yoke 40 and in which a movable jaw 46 is pivotally mounted on a pin 48 extending across the slot. The end of the yoke 40 terminates in a fixed jaw 50. A spring 52 supported on a pin 54 fixed in the yoke 40 at one side of the slot 44 adjacent the lower end thereof tends to force the movable jaw 46 outwardly relative to the fixed jaw 50.

This outward movement is limited by a collet 56 that may slide freely on the depending end of yoke 40 between a small projection 58 on the yoke and shoulders 60 and 62 on the movable and fixed jaws 46 and 50, respectively. A small recess 64 on the inside of the fixed jaw 50 provides an additional guiding means for the movable jaw 46 by receiving the lower portion of the shank 68 thereof. With reference to FIGURE 4, it may be seen that the collet 56 is controlled by stops 70 and 72 that are fixed in the sides of a protective housing 74 covering the most complex end of feeder 8. The distance between the stops 70 and 72 is the distance of travel of chuck 30 necessary for it to grasp the upper end portion of a deflector rod segment 16 and insert a greater portion of the length thereof through the small aperture 73 in the side of nozzle 12 and into the exhaust stream of the rocket engine 10. At the upper end of the stroke of piston 36, the chuck jaws 46 and 50 are in an open position to receive the upper-end portion of a deflector rod segment 16 fed forwardly by action of the compression springs 32. As the piston 36 continues to rise, the collet 56 is forced downwardly over a cam surface 78 on the shank 68 of movable jaw 46, causing the jaws to grasp the deflector rod segment tightly. Then as the piston 36 reverses its direction and lowers the deflector rod segment 16 through the aperture 76, the lower surface of collet 56 is engaged by the stop 72 which forces the collet 56 upwardly, allowing spring 52 to move the movable jaw 46 outwardly relative to the fixed jaw 50, releasing the terminal portion of the expended deflector rod segment into the exhaust stream of the rocket. By this action, the jaws are also released and in a position for grasping the upper end portion of the next expendable rod segment 16. It will be seen by reference to FIGURE 4 that the stop 72 also limits the forward movement of deflector-rod segments 16 by compression springs 32 to align the foremost segment with opening 76.

Figure 6:
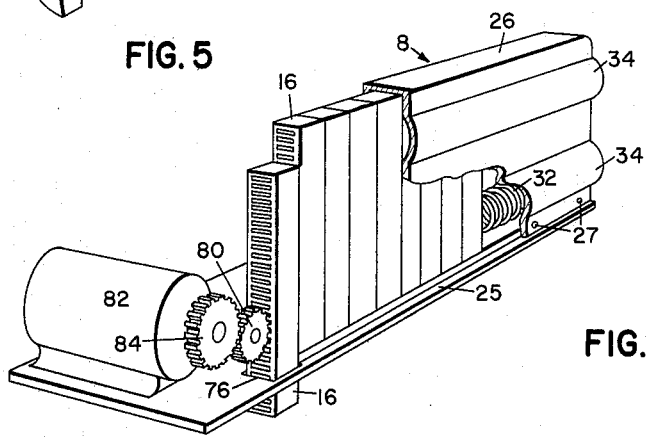
FIGURE 6 is a perspective view partly in section to show another modified electrically-operated feeder.

FIGURE 6 shows an alternate form of the feeder 8 incorporating the same type of spring loaded magazine for the expendable deflector-rod segments as was shown in FIGURE 4. In this embodiment of the feeder, however, the deflector-rod segments 16 are introduced into the exhaust stream of the rocket through the aperture 76 by means of a friction wheel 80 that engages the side of a segment 16. The friction wheel 80 is actuated by an electric motor 82 through a gear 84 to rotate the friction wheel 80, which, in this illustration also is in the form of a pinion gear to act against rack-gear teeth impressed in the side of expendable deflector rod segments 16 for positive control of the motion thereof. The friction wheel 80 may also be knurled to act against knurling on the side of a deflector rod segment, or it may be relatively smooth for frictional engagement of the deflector rod segment.

Figure 7:
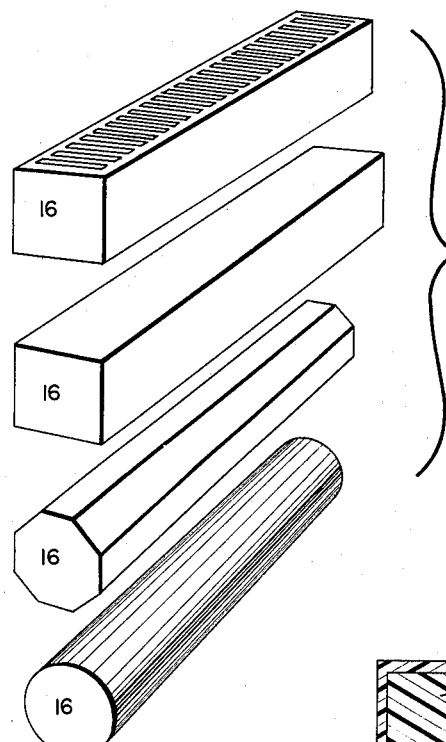
FIGURE 7 is a collective view illustrating some of the possible forms of deflecting rods that may be used.
Figure 8:
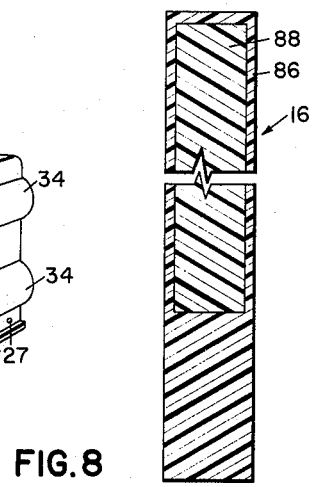
FIGURE 8 is a longitudinal sectional view of a deflector-rod segment that may be reactive in the environment of a rocket exhaust stream.

As shown in FIGURE 7, the deflector rod segments 16 can be any of a great variety of shapes in cross section and may or may not be impressed with rack-gear teeth or knurling for aid in the control thereof. It may be desirable that deflector rod segments 16 having circular cross sections be impressed with rack-gear teeth that are annular in form. A deflector-rod segment is illustrated in FIGURE 8 wherein an inert material 86 is filled with a material 88 such as ammonium oxalate that is reactive in the environment produced by a rocket engine exhaust, so that it can generate large quantities of gas that may amplify the shock wave effect and hence the ability to steer the rocket.

The range of different materials that may be used in the expendable, deflector-rod segments is obviously very large, since nearly all known solid materials erode or melt in the exhaust stream of a high-performance rocket and the only important consideration being the rate at which this action occurs on any given material. The use of highly-combustible or explosive materials, however, requires special precautions to achieve proper control, such as mixing with inert diluents. The composition and method of manufacture of deflector-rod segments of preferred constructions are indicated by the following examples, but it will be understood that rods of any suitable material may be used.

*Example No. 1.*—Particles of ammonium oxalate are mixed with particles of a glass fiber reinforced by epoxy or polyester resin (approximately 50% resin by weight), pressure molded and cured into the form of rods.

*Example No. 2.*—Pieces of silicon-dioxide cloth or graphite cloth impregnated with a phenolic resin are pressure-molded into the form of rods.

*Example No. 3.*—Metal rods each having the desired diameter are cut into proper lengths and encased in a thermal insulating material.

*Example No. 4.*—High-density graphite is pressure-molded into the form of rods.

In practice, the actuating device for the feeder 8 (the motor 82 or the fluid-operated cylinder 28) is controlled remotely by signals from the guidance mechanism of the rocket or from a control station on the ground, causing extension of a deflector-rod segment into the exhaust stream of the rocket when a change of course of the rocket is desired or a withdrawal of the deflector rod when the change of course has been achieved.

An improved means of steering a rocket has been described in detail consisting essentially of the introduction of small obstructions or expendable deflector rods into the exhaust stream of a rocket engine by means of a special feeder mechanism. The number and locations of feeders on any given hollow, divergent cone of a rocket nozzle is determined largely by the number of such nozzles on the rocket engine; and by proper locations of feeders 8 and attendant apertures 76, the pitch, yaw, and axial spin of a rocket may be controlled. It also may be noted that the feeder 8 may be detachable from the rocket nozzle and that the spring-loaded magazine 26 may be detachable from the remainder of the feeder. The invention is not restricted to any one form of nozzle means and FIGURE 3 shows how it may be incorporated into a plug nozzle. Therefore, without limitation in this respect the invention is defined by the following claims.

I claim:

1. A steering mechanism for rocket propelled vehicles of the type having a nozzle through which products of combustion escape in a jet stream and said nozzle having a wall of the same shape as the jet stream comprising, an opening in the wall of the nozzle, a consumable deflecting element of a solid material mounted on said nozzle for movement through the opening therein to project its end into and form an obstruction in the jet stream, and feeding means for progressively advancing the deflecting element into the jet stream as its projected end is consumed.

2. A steering mechanism for rocket propelled vehicles in accordance with claim 1 in which the nozzle has a plurality of openings angularly spaced with respect to each other, a magazine for holding a plurality of the consumable deflecting elements in side-by-side relationship adjacent each opening, and a reciprocating feeding means for each opening movable relative to the magazine for progressively feeding the deflecting elements through the opening and into the jet stream, successively.

3. A device for deflecting the direction of a jet stream in accordance with claim 1 in which the deflecting element has rack teeth at one side thereof.

4. A device for deflecting the direction of a jet stream in accordance with claim 1 in which the deflecting element contains a material which is reactive at the temperature of the jet stream to produce gas in the enviroment of the rocket jet stream.

5. A device for deflecting the direction of a jet stream issuing from a rocket engine having a surface of the same contour as and guiding the jet stream with at least one opening therein comprising, a plurality of deflecting segments mounted adjacent the opening in the surface for movement therethrough at an angle to the direction of the jet stream to form an obstruction in the jet stream, and means for progressively feeding each segment through the opening and into the jet stream and feeding successive segments through the opening one after the other.

6. A device for deflecting the direction of a jet stream in accordance with claim 5 in which the guiding surface is a nozzle in the form of a hollow cone diverging from an orifice and the deflecting segments are in the form of rods, the means for feeding the segments comprises a magazine constructed to holding a plurality of the consumable, deflecting-rod segments in side-by-side relationship, one end of said magazine being open adjacent said opening in the nozzle, a spring pressed follower in said magazine for advancing the segments toward its open end, a fluid operated ram, a chuck attached to said ram and having jaws to grip each deflector-rod segment as it is advanced through the magazine by the spring pressed follower to the open end, fluid means for operating said ram to progressively move each segment into the exhaust stream of a rocket through the opening in the nozzle, a collet for operating the jaws of the chuck, stop members supported in fixed positions adjacent the extremities of travel of said chuck for operating the collet to close the jaws of said chuck at one extremity of the travel thereof and open the jaws of the chuck at the other extremity, whereby said jaws grip the end portion of a deflector-rod segment at one extremity of the travel and release the segment at the other extremity, and guide means for positioning each of said segments for engagement by said chuck and in alignment with said opening in the side of said nozzle.

7. A device for deflecting the direction of a jet stream in acordance with claim 5 in which the guiding surface is a nozzle in the form of a hollow cone diverging from an orifice and the deflecting segments are in the form of rods, the feeding means comprising a magazine constructed to hold a plurality of expendable, deflector-rod segments in side-by-side relationship, one end of said magazine being open adjacent said opening in the nozzle, a spring pressed follower in said magazine for advancing the segments towards its open end, a friction wheel adjacent the open end of said magazine for frictionally engaging one side of a segment, guide means for guiding said segment into engagement with said friction wheel and in alignment with the opening in the side of said nozzle, and means for rotating the friction wheel to move the segment into the jet stream of the rocket.

References Cited by the Examiner

UNITED STATES PATENTS

| 1,879,187 | 9/1932 | Goddard. | |
| 2,945,344 | 7/1960 | Hutchinson | 60—35.6 |
| 3,022,190 | 2/1962 | Feldman | 60—35.6 |
| 3,026,806 | 3/1962 | Runton et al. | 60—35.6 |
| 3,036,430 | 5/1962 | Eggers et al. | 60—35.54 |
| 3,096,049 | 7/1963 | Karasinski | 60—35.54 X |

MARK NEWMAN, *Primary Examiner.*

ABRAM BLUM, *Examiner.*